United States Patent [19]

Willard

[11] Patent Number: 4,504,400

[45] Date of Patent: Mar. 12, 1985

[54] FLUID AND METHOD FOR PLACING GRAVEL PACKS

[75] Inventor: Ralph O. Willard, Tulsa, Okla.

[73] Assignee: The Dow Chemical Company, Midland, Mich.

[21] Appl. No.: 569,100

[22] Filed: Jan. 9, 1984

Related U.S. Application Data

[63] Continuation of Ser. No. 308,078, Oct. 2, 1981, abandoned, which is a continuation of Ser. No. 128,682, Mar. 10, 1980, abandoned.

[51] Int. Cl.$^3$ .............................................. E21B 43/04
[52] U.S. Cl. .................. 252/8.55 R; 166/278
[58] Field of Search ............... 252/8.55 R, 8.55 C; 166/278, 307

[56] References Cited

U.S. PATENT DOCUMENTS

| | | | |
|---|---|---|---|
| 3,498,380 | 3/1970 | Sparlin et al. | 166/278 |
| 3,675,717 | 7/1972 | Goins et al. | 166/278 |
| 3,868,996 | 3/1975 | Lybarger et al. | 166/250 |
| 3,892,275 | 7/1975 | Lybarger et al. | 166/250 |
| 4,151,878 | 5/1979 | Thomas | 166/307 |
| 4,151,879 | 5/1979 | Thomas | 166/307 |

OTHER PUBLICATIONS

Constein et al., SPE Paper 8802, presented at the Fourth Symposium on Formation Damage Control of the Society of Petroleum Engineers of AIME held Jan. 28-29, 1980 in Bakersfield, Calif.

Primary Examiner—Herbert B. Guynn

[57] ABSTRACT

A gelled aqueous fluoboric acid fluid useful as a carrying fluid for particulate solids (i.e. "gravel") to position such gravel in a wellbore against a permeable incompetent formation to minimize the migration of sand and other granular material from the formation into the wellbore when fluids are subsequently produced from the formation. For example, an 80 lb. per 1000 gallon aqueous gel of hydroxyethylcellulose containing about 8 wt percent fluoboric acid in the aqueous solution is loaded with from 10 to 20 lbs. of 20/40 mesh (0.42–0.84 mm) gravel and placed between a screen or slotted liner in the perforated casing and the face of an incompetent formation in a wellbore.

17 Claims, No Drawings

FLUID AND METHOD FOR PLACING GRAVEL PACKS

CROSS-REFERENCE TO RELATED APPLICATIONS

This application is a continuation of Application Ser. No. 308,078 which was filed Oct. 2, 1981, now abandoned, and which was in turn a continuation of Application Ser. No. 128,682 which was filed Mar. 10, 1980 and which is now abandoned.

BACKGROUND OF THE INVENTION

The invention is a gelled aqueous composition which is capable of serving as the fluid medium utilized to prepare a gravel slurry to be injected down a wellbore against the face of an incompetent formation in an oil, gas, water or geothermal well to reduce the migration of sand into the wellbore from the formation when the well is put on production. The invention also relates to a method for treating such a wellbore in an incompetent formation by placing a gravel pack in such a wellbore utilizing the gelled composition as a carrying fluid which subsequently is reduced in viscosity, positioning the gravel in a desired location without causing a reduction in permeability of the formation.

"Gravel packing" is well known in the art of gas and oil well treatment. A number of basic techniques are known for placing such "gravel packs" in a wellbore. U.S. Pat. No. 3,498,380 (1970) describes a method for placing high density gravel packs carrying from 10 to 25 lbs. of particulate solids per gallon by adding thickening or gelling agents to the carrier fluid. Cellulosic materials have been utilized to thicken water based carrying fluids of this nature and to such fluids have been added acidic materials to "break", i.e. reduce the viscosity of, such thickened aqueous fluids; U.S. Pat. No. 3,892,275 (1975). Others have employed aqueous based gravel pack slurries which are thickened with various natural gums and cellulosic, which aqueous fluids contain at least one water-soluble fluoride salt which is converted to hydrofluoric acid in solution by an acid-generating material which is also present. In such systems, a weak acid/weak acid salt buffer system is employed; U.S. Pat. Nos. 3,828,854 (1974); 3,889,753 (1975); 3,868,996 (1975). Thickened fluids with pHs of less than about 1.5 are not generally described in these patents, however, except that a combination of ammonium fluoride and HCl is described in the '753 patent.

The utilization of aqueous fluoboric acid solutions for acidizing siliceous clay containing formations to stablize clays in such formations and also in conjunction with mud acid (HCl/HF) solutions is known: U.S. Pat. Nos. 4,151,878 and 4,151,879 (1979). Neither of these patents suggest that a gelled composition comprised of water, fluoboric acid, and a hydroxyethylcellulose gelling agent may be advantageously employed for gravel packing of wellbores.

SUMMARY OF THE INVENTION

A gelled, aqueous composition capable of transporting particulate solids as a slurry and capable of stabilizing clays and fines in a formation containing same which comprises:
 (A) water;
 (B) a hydroxyalkylcellulose; and
 (C) fluoboric acid is described which is employed in a method of treating a wellbore by injecting into the wellbore, opposite a permeable formation therein, a slurry of particulate solids of about 0.2 to about 1.5 mm particle size in a carrying fluid comprising the aforementioned gelled composition, thereby stabilizing any clays and fines in said formation which are contacted by said composition and simultaneously creating a permeable layer of the particulate solids against the face of the formation, thereby minimizing the migration of sand and other granular materials into the wellbore from the formation.

In contrast to aqueous packing fluids which contain HF or combinations of HF and HCl, both clays and fines are stabilized. Therefore, they are less likely to be disturbed by increased fluid flow in such a wellbore which results following an acid stimulation and/or gravel packing treatment. Clays which may be present in the formation are desensitized so that they are no longer swollen or dispersed by contact with incompatible fluids.

In a preferred mode of the invention, the gelled aqueous composition further comprises hydrochloric acid in an amount sufficient to impart a pH of about 1.5 preferably about 1.0 or less to the gelled composition. In another preferred mode, component B is present, per 1,000 parts of water, in an amount of 0.1 to about 15 parts, by weight. Preferably, component B is a hydroxyethylcellulose.

In a preferred method of treating, utilizing the gelled composition, hydrochloric acid is present in the fluid in an amount sufficient to impart a pH of about 1.5 preferably about 1.0 or less to the composition. In another mode, after injection of the invention fluid which further comprises HCl, the temperature of the gelled composition is maintained at about 30° C. or greater for a time sufficient to reduce its viscosity to about 20 percent or less of its original viscosity before injection. Suitably, viscosity of the gelled composition prior to injection is about 100 centipoise or greater, preferably about 200 centipoise or greater and more preferably about 250 centipoise or greater. In another mode of the invention, the temperature of the gelled composition after injection is maintained at about 50° C. or greater causing the fluid to break even more quickly after the gravel packing is placed so that the well may be cleaned up and back in production even sooner.

DETAILED DESCRIPTION OF THE INVENTION

The gelled aqueous composition of the invention may be prepared from aqueous solutions of fluoboric acid which may be obtained as such or which may be generated by the action of boric acid on a fluoride salt such as ammonium fluoride $NH_4F_2$ or ammonium bifluoride, $NH_4.HF$ in the presence of strong acid, e.g. HCl, in aqueous solution. Such aqueous solutions may be natural or artifical light brines which contain up to about 5 or 6 percent of noninterfering salts such as sodium chloride, potassium chloride or ammonium chloride. Brines containing divalent metal salts, such as $Ca^{++}$, should be avoided. Fresh water is preferred for this purpose, however. Fluoboric acid may also be prepared by mixing boric and hydrofluoric acids. For more detailed description of alternative methods of preparing fluoboric acid solutions, the reader is referred to U.S. Pat. No. 4,151,879, column 2, line 55-column 3, line 45 which portion is hereby incorporated by reference. A fluoboric acid solution containing less than about 3% HF is preferred.

The hydroxyalkylcellulose component is selected from standard, commercially available cellulosic products such as hydroxyethylcelluloses, a term which is meant to include hydroxyethylcelluloses with minor degrees of methoxy substitution, and hydroxypropylcelluloses which is likewise meant to include hydroxypropylcelluloses with minor degrees of methoxy substitution. Preferably, a straight hydroxyethylcellulose with no significant degree of methoxy substitution is preferred. Cellulosic products of this nature commonly are treated with a dialdehyde crosslinking agent such as glyoxal to permit the dispersion of these materials in aqueous solutions at neutral or basic pH's. The glyoxal treatment is reversable on the acid side whereby the cellulosic is hydrated permitting it to form a gel in aqueous solutions. The amount of component B employed is not critical and may suitably range from about 1 to about 125 lbs. per 1000 gallons of water or about 0.1 to about 15 parts per 1000 parts water by weight. Depending on the gravel loading to be employed in preparing a slurry from the gelled aqueous composition for gravel placement, the loading of the cellulosic can be varied-with higher concentrations for heavier gravel loadings and lower concentrations for lighter loadings. Preferably about 20 to about 90 lbs. (about 2.5 to about 12 parts per 1000 parts by weight water) and more preferably about 60 to about 80 lbs. cellulosic (about 7.5 to about 10 parts per 1000 parts water by weight) per 1000 gallons of water are employed.

When HCl is employed as a component of the gelled composition, sufficient HCl or HCl/HF mixture is employed to bring the pH of the gelled composition to about 1.5 or less, preferably about 1.0 or less.

When the gelled composition of the invention is used as a carrying fluid in a method for treating a wellbore, the amount of "gravel" will vary from about 5 lbs. up to about 25 or 30 lbs. of gravel per gallon of carrying fluid. Preferably about 10 to about 20 lbs. gravel per gallon is employed. The viscosity of the carrying fluid will vary according to the amount of gravel to be carried in a proportionate fashion and can be determined to trial and error. Generally, the carrier liquid will have a viscosity of about 50 to about 1000 centipoise, preferably about 100 to 400 centipoise at 25° C. for normal applications. Slurries prepared accordingly can be pumped at a rate of between about 0.1 and about 4 barrels per minute, preferably at a rate of around 0.1 to about 3 barrels per minute, depending on the tubing length and diameter.

The "gravel" to be employed in the treating method includes any particulate solid such as gravel, sand, cement clinker, ground nut shells or other material commonly used in gravel packing operations. Generally, the particulate materials useful for this purpose will have a particle size in the range of about 0.2 to about 1.5 mm, preferably about 0.25 to about 0.85 mm. It is also preferable that the gravel be screened within certain size ranges. One commonly employed gravel is a 20/40 mesh gravel, of about 0.42 to about 0.84 mm and another is 40/60 mesh gravel of about 0.25 to about 0.42 mm particle size. Gravel screened twice, i.e. "resieved" gravel, is preferably employed.

Standard placement techniques, well known in the art of gravel packing, may be employed in utilizing the composition of the invention to slurry gravel and place at the desired location in a wellbore against the incompetent formation. Techniques such as those described in U.S. Pat. No. 3,498,380 are highly suitable and column 3, line 12 through column 4, line 40 of said patent is hereby incorporated by reference.

In preparation of the gelled composition, it is preferred to first disperse the cellulosic component in an aqueous solution with mixing and thereafter add the fluoboric acid component or generate it in situ by finally adding a strong acid, e.g. HCl or HCl/HF mixtures. The concentration of fluoboric acid is preferably about 1 to about 48 percent, more preferably about 2–25 percent and most preferably about 5–15 percent the combined weight of components A and B. Where the fluoboric acid is prepared from the reaction of the ammonium fluoride or bifluoride salt with boric acid, it is preferred to first prepare an aqueous solution of the ammonium salt, add boric acid thereto with mixing until both components are completely dissolved and then disperse the cellulosic into that aqueous solution. Any other standard additives may be introduced to the aqueous fluid at this point, for example, corrosion inhibitors and the like. The HCl or HCl/HF mixtures are then added at this point in time with further mixing until full gel strength has been achieved.

A gravel slurry of the gelled composition may be beneficially employed in wellbores wherein the BHST ranges from about 25° C. to about 125° C.

The instant method of placing gravel packing is beneficially employed following acid stimulation of a siliceous formation with a mud acid and/or fluoboric acid.

SPECIFIC EMBODIMENTS OF THE INVENTION

A gelled composition of the invention is prepared by adding about 60 parts by weight ammonium bifluoride to about 345 parts by weight water with mixing for about 5 minutes. To this aqueous mixture, about 30 parts by weight boric acid is added with mixing until completely dissolved. To this aqueous solution is added about 4.8 parts by weight hydroxy-ethylcellulose with further mixing. At this point, about 115 parts by weight of a 35 volume percent aqueous HCl solution is added with good mixing until a viscosity of about 340 centipoise (at 100 rpm on a Fann 35 viscometer) is obtained. This fluid has a pH of less than about 1.

In the event that the hydroxyalkylcellulose must be added to an aqueous solution already containing the fluoboric acid or HCl, it is preferably first dispersed in an alcohol, kerosene or diesel. Preferably, a water soluble alcohol is employed for this purpose, e.g. ethylene glycol monoethyl ether.

TREATMENT 1

An oil well producing from a coastal bay area of the Gulf of Mexico was shut-in due to high sand production. At an earlier date, the well had produced about 200 barrels of oil per day (BOPD) and about 550 barrels of water per day (BWPD) after acid stimulation. Sand fill was washed out and perforations between about 7270–7280 ft. were cleaned with a wash tool. A sump packer was set in the 5½ in. casing and about 20 feet of 0.012 in guage (0.30 mm), 2⅜ in. diameter screen was set across the perforated interval with 120 ft. of 2⅜ in. blank. A Dowell model 14 packer with crossover tool was set at about 7140 ft. The bottom hole pressure (BHP) was about 3050 psi and the bottom hole static temperature was about 160° F. (71° C.).

Treatment was started by injecting 500 gal. of about a 10% HCl acid dispersion, followed by 1000 gal.

7.5-1.5 (HCl-HF) mud acid and 10 bbl of a weak ammonium chloride spacer solution. About 1000 gallons of about an 8% fluoboric solution containing a commercial corrosion inhibitor was prepared in the manner described in U.S. Pat. No. 4,151,879 by mixing 740 gal. fresh water, 500 lb. ammonium bifluoride, 168 gal. of 25% HCl and 20% HF and 500 lb. boric acid. Pumping was then stopped for about 10 minutes while the gelled composition of the invention was prepared by adding with mixing, about 250 lb. ammonium bifluoride to about 380 gal. fresh water, then adding 250 lb. of boric acid followed by 40 lb. of hydroxyethylcellulose. Then about 84 gal. of 25-20 acid (25 wt % HCl-20 wt % HF) was added and with mixing, the viscosity began to build until it reached about 320 centipoise at 68° F. (20° C.) (field test equivalent to 100 rpm on Fann 35 viscometer). Then about 6 bbl. of the gelled composition, containing about 8 percent $HBF_4$ and about 2 percent HF, having a pH of about 1 due to unreacted HCl present, was pumped to the formation followed by about 10 bbl. gravel slurry, prepared by mixing the remaining 6 bbl. of the gelled composition with about 3800 lb. of 20/40 resieved sand to form about a 15 lb./gal. slurry. The slurry was pumped down at a rate of about 2 barrels per minute (BPM) until it reached the perforations at which time the rate was slowed to 1 BPM. A screen-out of 1000 psi (about 500 psi over injection pressure) was obtained after a calculated 0.5-1 bbl. of slurry had been placed between the perforated casing and the formation and about 3 bbl. of slurry had been placed in the annular space between the screen and the casing. The gel remaining in the pipe above the screen was reversed out and was found to have risen from 68° F. (20° C.) to 76° F. (24° C.). After about 9 months, the well was producing about 190 BOPD and about 820 BWPD.

TREATMENT 2

A treatment was performed in a newly drilled gas well in a Miocene sand formation employing a treatment sequence similar to that of Treatment 1. The interval treated was at about 5050 ft. and the BHST about 140° F. (60° C.). In this case, about 3000 gal. 12-3 mud acid, followed by 250 gal. of 3 percent aqueous ammonium chloride spacer were first pumped. About 3000 gal. of about 8% $HBF_4$ prepared using ammonium bifluoride, boric acid and 35 percent HCl in the manner taught in U.S. Pat. No. 4,151,879, was then injected followed by 8 bbl. of a gelled $HBF_4$ composition of the invention. This gelled composition was prepared by mixing 16 bbl. (about 670 gal.) fresh water with 1000 lb. of ammonium bifluoride and 500 lb. of boric acid, with about 80 lb. of hydroxyethylcellulose. To this mixture, was added about 194 gal. of 35 wt. percent HCl to provide about 24 bbl. of gelled fluid. About 12 bbl. of the gelled fluid was mixed with 7600 lb. of 40/60 resieved sand to form 20 bbl. of slurry which was pumped after the 8 bbl. of gelled fluid previously mentioned, and followed with the remaining 4 bbl. of the gelled, $HBF_4$ containing fluid. The slurry was pumped at about 1.5-2 BPM until it reached the packer/crossover at which time the pumping rate was reduced to about 0.5-1 BPM. Screen-out occurred at 1800 psi (about 1300 psi over injection pressure) after a calculated 3 bbl. of slurry was placed between the perforated casing and the formation face and about 5 bbl. of slurry was placed in the annular space between the screen and casing. The gelled fluid before injection had a viscosity of 340 centipoise at 75° F. (24° C.).

This well was subsequently put on production and maintained a production rate of about 4 million cubic feet per day for 8 months.

What is claimed is:

1. A gelled, aqueous composition capable of transporting particulate solids as a slurry and capable of stabilizing clays and fines in a formation containing same, which composition comprises:
   (A) water;
   (B) a hydroxyalkylcellulose; and
   (C) an acidic breaker consisting essentially of either fluoboric acid or a mixture of fluoboric acid and hydrochloric acid, wherein the concentration of fluoboric acid is about 1 to about 48 percent of the combined weight of Components A and B.

2. The composition of claim 1 in which hydrochloric acid is present in an amount sufficient to impart a pH of about 1.5 or less to said composition.

3. The composition of claim 1 wherein the amount of component B present, per 1000 parts water, is about 0.1 to about 15 parts, by weight, and is a hydroxyethylcellulose.

4. The composition of claim 1 which further comprises particulate solids of about 0.2 mm to about 1.5 mm particle size.

5. The composition of claim 1 wherein Component B is a hydroxyethylcellulose or hydroxypropylcellulose.

6. The composition of claim 5 which further comprises particulate solids of about 0.2 mm to about 1.5 mm particle size.

7. The composition of claim 6 in which hydrochloric acid is present in an amount sufficient to impart a pH of about 1.5 or less to said composition.

8. The composition of claim 7 wherein the amount of hydrochloric acid is sufficient to impart a pH of about 1 or less to said composition.

9. The composition of claim 8 wherein the amount of Component B present, per 1000 parts water, is about 0.1 to about 15 parts, by weight.

10. The composition of claim 9 wherein Component B is a hydroxyethylcellulose.

11. The composition of claim 1 wherein said composition has an initial viscosity of about 250 centpoise or greater; comprises sufficient hydrochloric acid to impart a pH of about 1 or less; comprises about 2 to about 20 percent fluoboric acid based on the combined weight of Components A and B; comprises about 0.1 to about 15 parts per 1000 parts water, by weight, of a hydroxyethylcellulose as Component B; and comprises particulate solids having a particle size of about 0.25 to about 0.85 mm.

12. A method of treating a wellbore comprising injecting into said wellbore, opposite a permeable formation therein, a slurry of particulate solids of about 0.2 to about 1.5 mm particle size in a carrying fluid comprising the gelled composition of claim 1, stabilizing any clays and fines in said formation which are contacted by said composition and simultaneously creating a permeable layer of said particulate solids against the face of said formation, thereby minimizing the migration of sand and other granular materials into the wellbore from the formation.

13. The method of claim 12 wherein the gelled composition contains hydrochloric acid in an amount sufficient to impart a pH of about 1.5 or less to said composition.

14. The method of claim 13 which after injection further comprises maintaining the temperature of said gelled composition at about 30° C. or greater for a time sufficient to reduce its viscosity to about 20 percent or less of its original viscosity.

15. The method of claim 14 wherein the viscosity of said gelled composition prior to injection is about 150 centipoise or greater.

16. The method of claim 13 wherein the gelled composition, prior to injection, has a viscosity of about 250 centipoise or greater, contains sufficient hydrochloric acid to impart a pH of about 1 or less, contains about 2–20 percent fluoboric acid based on the combined weight of components A and B and the particle size of the particulate solids is about 0.25 to about 0.85 mm, and component B is a hydroxyethylcellulose.

17. The method of claim 12 which further comprises removing residual gelled fluid from the wellbore after injection of the slurry is completed.

* * * * *